US010417232B2

(12) United States Patent
Adams et al.

(10) Patent No.: US 10,417,232 B2
(45) Date of Patent: Sep. 17, 2019

(54) ASSOCIATING HARDWARE TO STORE APPLICATIONS

(71) Applicant: Microsoft Technology Licensing, LLC, Redmond, WA (US)

(72) Inventors: Samuel D. Adams, Bellevue, WA (US); Kumar Rajeev, Redmond, WA (US); Benjamin S. McGregor, Redmond, WA (US); Doron J. Holan, Mercer Island, WA (US); Viraf R. Gandhi, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/852,868

(22) Filed: Dec. 22, 2017

(65) Prior Publication Data

US 2019/0197164 A1   Jun. 27, 2019

(51) Int. Cl.
| | |
|---|---|
| *G06F 9/44* | (2018.01) |
| *G06F 16/2455* | (2019.01) |
| *H04L 29/08* | (2006.01) |
| *G06F 8/61* | (2018.01) |
| *G06F 16/248* | (2019.01) |
| *G06F 16/25* | (2019.01) |

(52) U.S. Cl.
CPC .......... *G06F 16/24553* (2019.01); *G06F 8/61* (2013.01); *G06F 16/248* (2019.01); *G06F 16/252* (2019.01); *H04L 67/34* (2013.01)

(58) Field of Classification Search
None
See application file for complete search history.

(56) References Cited

U.S. PATENT DOCUMENTS

| | | |
|---|---|---|
| 9,081,747 B1 | 7/2015 | Tabieros et al. |
| 9,424,002 B2 | 8/2016 | Bruno et al. |
| 9,424,018 B2 | 8/2016 | Wong et al. |

(Continued)

FOREIGN PATENT DOCUMENTS

| | | |
|---|---|---|
| WO | 2009148781 A1 | 12/2009 |
| WO | 2015179647 A1 | 11/2015 |

OTHER PUBLICATIONS

"Device Compatibility", Retrieved from<<https://developer.android.com/guide/practices/compatibility.html#how>>, Retrieved on: Oct. 26, 2017, 6 Pages.

(Continued)

*Primary Examiner* — Qamrun Nahar
(74) *Attorney, Agent, or Firm* — Arent Fox LLP (57) ABSTRACT

Methods and devices for identifying available applications for use with hardware of a computer device may include generating an application request with at least one device identification and a hardware identification to determine available applications. The methods and devices may include transmitting the application request to a remote application store. The methods and devices may include receiving, from the remote application store, an available application list with one or more applications having application relationship metadata that identifies compatible usage with the at least one hardware identification. The methods and devices may include presenting the available application list on a display of the computer device.

19 Claims, 5 Drawing Sheets

(56) References Cited

U.S. PATENT DOCUMENTS

| | | |
|---|---|---|
| 9,569,196 B2* | 2/2017 | Das .......................... G06F 8/65 |
| 2011/0099516 A1 | 4/2011 | Hughes |
| 2012/0191694 A1 | 7/2012 | Gardiol et al. |
| 2012/0330786 A1 | 12/2012 | Paleja et al. |
| 2013/0019233 A1 | 1/2013 | Pardehpoosh et al. |
| 2013/0346965 A1 | 12/2013 | Conlan et al. |
| 2015/0186533 A1* | 7/2015 | Patil ................. G06F 17/30867 707/723 |
| 2016/0085533 A1 | 3/2016 | Venkata et al. |
| 2017/0132294 A1 | 5/2017 | Cooper |
| 2017/0269916 A1 | 9/2017 | Singhal |
| 2017/0289283 A1 | 10/2017 | Ungerer et al. |

OTHER PUBLICATIONS

"MySamsung", Retrieved from<<https://play.google.com/store/apps/details?id=com.samsung.concierge&hl=en>>, Sep. 1, 2017, 3 Pages.

"Download apps and Games Using the App Store—Apple Support", Retrieved from https://web.archive.org/web/20171015034352/https://support.apple.com/en-us/HT204266, Oct. 15, 2017, 4 Pages.

"International Search Report and Written opinion Issued in US Patent Application No. PCT/US2018/063506", dated Mar. 14, 2019, 12 Pages.

* cited by examiner

| Hardware ID 16, 17 | Application 34 | Relationship Type 22 |
|---|---|---|
| Hardware 1 | Video App | Enhancer |
| Hardware 2 | Video App | Enhancer |
| Hardware 1 | TV Remote App | Compatible |
| Hardware 3 | Keyboard App | Companion |
| ⋮ | ⋮ | ⋮ |

202 — row 1
204 — row 2
206 — row 3
208 — row 4

ASSOCIATING HARDWARE TO STORE APPLICATIONS

BACKGROUND

The present disclosure relates to identifying available applications for use with a computer device.

Many applications are designed to work with specific hardware of a computer device. For example, applications may be published by device manufacturers to officially enable users to manage and/or operate devices of the manufacturers. In addition, third parties may publish applications to work with specific devices and/or enhance a user's experience when using the devices. When a user wants to identify new and/or additional applications to use with a device, a user typically performs a generic search at an application store for the new applications. Alternatively, a device driver shipped with the device may identify software that is compatible to use with the computer device.

Thus, there is a need in the art for improvements in identifying available applications for use with a computer device.

SUMMARY

The following presents a simplified summary of one or more implementations of the present disclosure in order to provide a basic understanding of such implementations. This summary is not an extensive overview of all contemplated implementations, and is intended to neither identify key or critical elements of all implementations nor delineate the scope of any or all implementations. Its sole purpose is to present some concepts of one or more implementations of the present disclosure in a simplified form as a prelude to the more detailed description that is presented later.

One example implementation relates to a computer device. The computer device may include memory to store data and instructions, a processor in communication with the memory, an operating system in communication with the memory and the processor, wherein the operating system is operable to: generate an application request with at least one device identification and a hardware identification to determine available applications; transmit the application request to a remote application store; receive, from the remote application store, an available application list with one or more applications having application relationship metadata that identifies compatible usage with the at least one hardware identification; and present the available application list on a display of the computer device.

Another example implementation relates to a method for identifying available applications for use with hardware of a computer device. The method may include generating, at an operating system executing on the computer device, an application request with at least one device identification and a hardware identification to determine available applications. The method may include transmitting the application request to a remote application store. The method may include receiving, from the remote application store, an available application list with one or more applications having application relationship metadata that identifies compatible usage with the at least one hardware identification. The method may include presenting the available application list on a display of the computer device.

Another example implementation relates to a computer-readable medium storing instructions executable by a computer device. The computer-readable medium may include at least one instruction for causing the computer device to generate an application request with at least one device identification and a hardware identification to determine available applications. The computer-readable medium may include at least one instruction for causing the computer device to transmit the application request to a remote application store. The computer-readable medium may include at least one instruction for causing the computer device to receive, from the remote application store, an available application list with one or more applications having application relationship metadata that identifies compatible usage with the at least one hardware identification. The computer-readable medium may include at least one instruction for causing the computer device to present the available application list on a display of the computer device.

Additional advantages and novel features relating to implementations of the present disclosure will be set forth in part in the description that follows, and in part will become more apparent to those skilled in the art upon examination of the following or upon learning by practice thereof.

DETAILED DESCRIPTION

This disclosure relates to devices and methods for identifying available applications for use with hardware of computer devices. Many applications may be designed to work with specific hardware. Hardware generally has a specific hardware identification (ID) that may be used to associate the hardware with applications designed to work on the hardware. The hardware ID may be the device identity from the various device stacks and/or buses. For example, the hardware ID for plug and play (PnP) devices (e.g., peripheral component interconnect (PCI) and universal serial bus (USB) devices) may be derived from the bus used to load specific drivers to hardware. In addition, protocol devices (e.g., Bluetooth and universal plug and play (UPnP) devices) may have a similar concept of identity as plug and play devices that may be used as the hardware ID.

The hardware ID may also include unique device interface information that allows communication with a device. For example, the hardware ID may be derived from device interfaces which describe a functional programming interface. In standard PnP, a device node enumerated by a bus can have 0 to n interfaces. For example, the hardware ID may be a Globally Unique Identifier (GUID) associated with the interfaces. A GUID may be a unique set of one or more numbers, letters, and/or characters used to identify the interfaces. These interfaces are how a program interfaces with the device and/or a device driver. A program uses CreateFile to open a handle to the device. The program may then use that handle to send IOCTL data packets in a format defined by the GUID contract of the interface. One example may include a scanner interface. Likewise, Bluetooth (and other protocols) have a similar construct. In the case of Bluetooth, they are called profiles and the profiles may be used as GUIDs. In UPnP, for example, they are called services, which are strings and the strings may be used a GUIDs. A Bluetooth profile is also a programmatic contract that defines how you may use a device. For example, advanced audio distribution profile (A2DP) is used to control the Bluetooth device as a medial player, so devices that have A2DP, such as Bluetooth speakers, may be identified by the A2DP profile. For example, a UPnP device may support the media server service, which is how a user knows a television may be used to play a movie.

The devices and methods may provide a relationship between the hardware IDs and the various applications that may use the hardware. The relationship between devices and their functionality methods may be stored in application relationship metadata along with one or more applications in one or more remote application stores. The application relationship metadata may identify compatible usage with hardware. For example, an application may have a 1 to r (where r is an integer) matches to hardware the application supports. A match may be defined as one or more of a hardware ID, hardware type, and a relationship type. Examples of relationship types may include, but are not limited to, companion applications, compatible applications, and enhancer applications. Companion applications may include, for example, applications published by an original equipment manufacturer (OEM) or an independent hardware vendor (IHV) officially to enable users to manage and/or operate a device. For example, a companion application may be the OEM's control panel application which is intended for a one to one match with the hardware type and the only official hardware support application for that hardware ID. Compatible applications may include, for example, applications published by third parties for specific devices. An example compatible application may include a third party application to control a television. Another example of a compatible application may include a virtual reality (VR) game that works with a plurality of VR headsets. Compatible applications may exist to fill functionality gaps and/or missing applications from the OEM. Enhancer applications may include applications that know how to use classes of devices or device functionality as defined by a device interface. For example, a photograph editing application may support scanners for image capture.

The remote application stores may provide an interface with the computer devices so that the computer devices may request a list of applications with compatible usage to the hardware of the computer devices and/or the hardware of one or more devices in communication with the computer device. In addition, the computer devices may also request a list of applications based on additional selection criteria. One example may include the computer device requesting a list of application with a specific relationship type. For example, the computer device may request applications that have a relationship type of enhancer applications to the hardware of the computer device. The remote application stores may identify and display applications with compatible usage to the hardware of the computer devices and satisfy any other criteria included in the request.

The computer devices may query the remote applications stores to identify applications for the hardware of the computer devices instead of this information being hard-coded into a driver package. As such, the methods and devices may automatically discover, offer, and/or install new applications for use with the hardware of the computer device independent of using driver packages of the computer devices.

Figure 1:
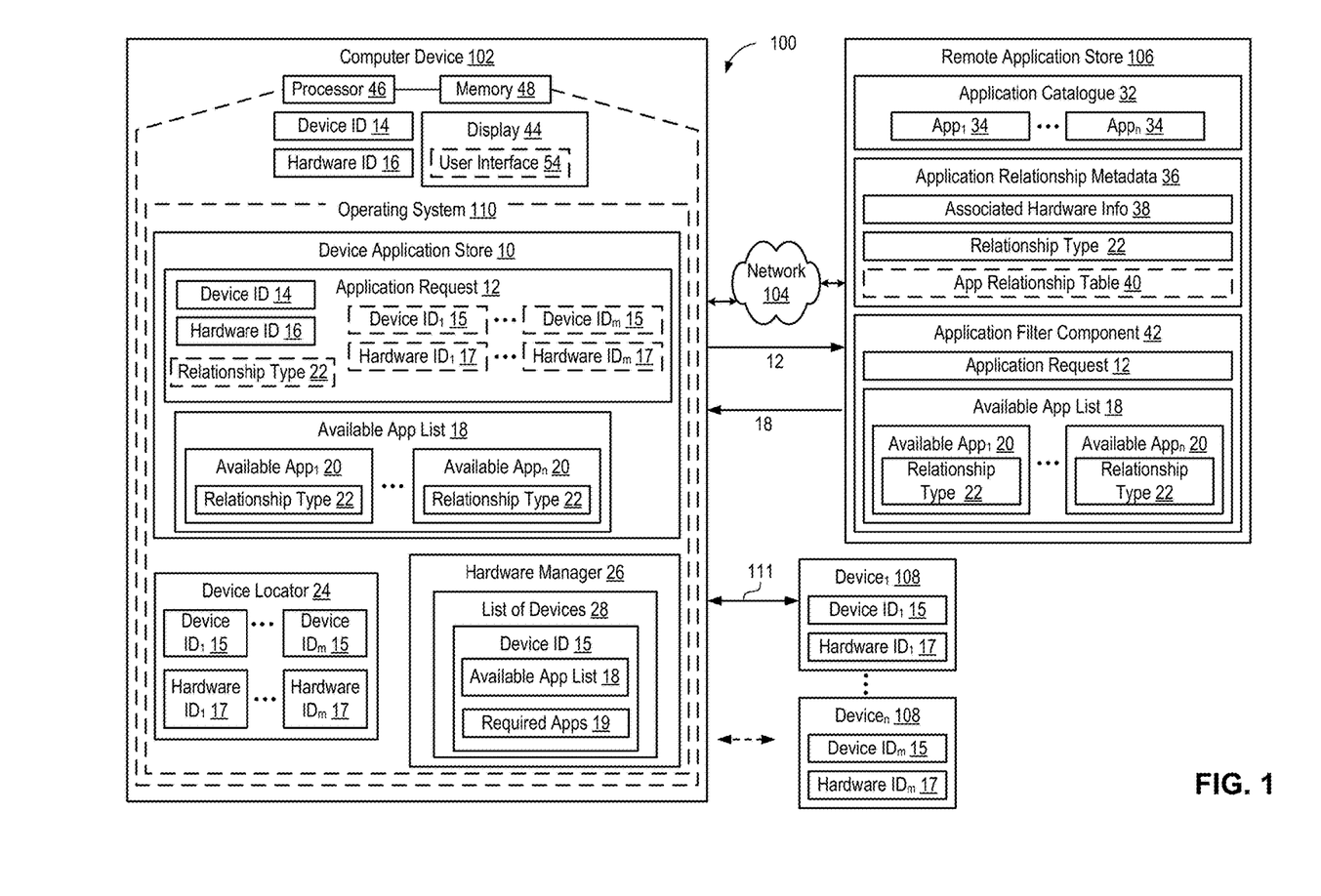
FIG. 1 is a schematic block diagram of an example computer device in communication with an example remote application store in accordance with an implementation.

Referring now to FIG. 1, illustrated is an example system 100 that may be used for identifying available applications for use with hardware of a computer device 102. Computer device 102 may be in communication with one or more remote application stores 106 via a wireless and/or wired network 104. In an implementation, remote application store 106 may be on computer device 102. Remote application stores 106 may have an application catalogue 32 with a plurality of applications 34 up to n (where n is an integer) that computer device 102 may retrieve for use on computer device 102. Computer device 102 may send an application request 12 to remote application store 106 to determine available applications 34 for use on computer device 102. Remote application store 106 may determine an available application list 18 with at least one application 20 that may be compatible for use with the hardware of computer device 102. For example, available applications 20 may be designed to work with and/or operate on the hardware of computer device 102. Remote application store 106 may transmit the available application list 18 to computer device 102 and computer device 102 may present the available application list 18 on a user interface 54 of a display 44.

Computer device 102 may include a device ID 14 that identifies computer device 102. In addition, computer device 102 may include a hardware ID 16 that identifies the hardware of computer device 102.

Computer device 102 may include an operating system 110 executed by processor 46 and/or system memory 48 of computer device 102. System memory 48 may be configured for storing data and/or computer-executable instructions defining and/or associated with operating system 110, and processor 46 may execute operating system 110. An example of system memory 48 can include, but is not limited to, a type of memory usable by a computer, such as random access memory (RAM), read only memory (ROM), tapes, magnetic discs, optical discs, volatile memory, non-volatile memory, and any combination thereof. An example of processor 46 can include, but is not limited to, any processor specially programmed as described herein, including a controller, microcontroller, application specific integrated circuit (ASIC), field programmable gate array (FPGA), system on chip (SoC), or other programmable logic or state machine. Computer device 102 may include any mobile or fixed computer device, which may be connectable to a network. Computer device 102 may be, for example, a computer device such as a desktop or laptop or tablet computer, a cellular telephone, a gaming device, a mixed reality or virtual reality device, a music device, a television, a navigation system, a camera, a personal digital assistant (PDA), or a handheld device, or any other computer device having wired and/or wireless connection capability with one or more other devices.

Operating system 110 may include a device application store 10 that may be used to search for and/or present available applications 20 for use with computer device 102 and/or one or more devices 108 in communication with computer device 102. Device application store 10 may transmit an application request 12 to one or more remote application stores 106 to determine one or more available applications 20 for computer device 102. The application request 12 may include the device ID 14 and the hardware ID 16 of computer device 102.

The application request 12 may also include additional search criteria, such as, but not limited to, a relationship type 22 requested for the one or more available applications 20. For example, the application request 12 may only want to identify available applications 20 with a relationship type 22 of companion applications so that only official OEM applications for the hardware ID 16 may be identified. Another example search criteria may be a specific type of application. For example, the application request 12 may only want to identify video applications. As such, the application request 12 may be used to query the remote application stores 106 for available applications 20 that match the hardware ID 16 and/or additional search criteria that may be included in the application request 12.

In addition, device application store 10 may transmit an application request 12 to one or more remote application stores 106 to determine one or more available applications 20 for at least one device 108 in communication with computer device 102. The application request 12 may include one or more device IDs 15 and hardware IDs 17 up tom (where m is an integer) of devices 108 in communication with computer device. Devices 108 may be plug and play devices connected to computer device via a wired connection 111, such as, but not limited to PCI and USB devices. For example, the hardware IDs 17 of plug and play devices may be derived from the bus identities that may be used to load specific drivers to hardware. Devices 108 may also be protocol devices, such as, but not limited to, Bluetooth and universal plug and play (UPnP) devices in communication with computer device 102 via network 104. The hardware IDs 17 may also include unique device interface information that allows communication with a device. For example, the hardware ID may be derived from device interfaces which describe a functional programming interface.

Device application store 10 may receive the one or more device IDs 15 and/or hardware IDs 17 from a device locator 24 on computer device 102. Device locator 24 may actively listen for new device 108 arrivals. For example, when a new plug and play device 108 is connected to computer device 102, device locator 24 may identify the new device 108 and may transmit the device ID 15 and/or hardware ID 17 to device application store 10. In addition, device locator 24 may identify new network devices 108 in communication with computer device 102 via, for example, Bluetooth, Web Services for devices (WSD), Bluetooth low energy (BTLE) beacon and/or other network connections, and may transmit the device ID 15 and/or hardware ID 17 of the identified devices 108 to device application store 10. For example, device locator 24 may identify a new wireless keyboard in communication with computer device 102.

Device application store 10 may automatically perform one or more queries for available applications 20 based on the device ID 14 and/or hardware ID 16 of computer device 102. In addition, device application store 10 may automatically perform one or more queries for available applications 20 based on any received device IDs 15 and/or hardware IDs 17 of devices 108 in communication with computer device 102. For example, device application store 10 may transmit one or more application request 12 with the device IDs 14, 15 and/or the hardware IDs 16, 17 to remote application store(s) 106.

Remote application store 106 may include an application filter component 42 that may receive the application request 12 from computer device 102. Application filter component 42 may filter the application catalogue 32 and determine one or more available applications 20 based on at least the received hardware IDs 16, 17.

Application filter component 42 may access application relationship metadata 36 associated with applications 34 in the application catalogue 32 to determine the available applications 20 for computer device 102 and/or devices 108. Application relationship metadata 36 may include, for example, hardware information 38 that identifies compatible usage between applications 34 and various hardware. An application developer may identify a relationship between the application 34 and the various hardware that the application 34 supports. For example, an application developer may associate one or more hardware IDs of hardware that the application may use when providing the application 34 to remote application store 106. An application may have a 1 to r (where r is an integer) matches to hardware the application supports. A match may be defined as a hardware ID, hardware type, and relationship type. As such, applications may match to a variety of hardware and/or to a plurality of device classes. In addition, an application package associated with the application 34 may be updated to include the relationship information that identifies the various hardware that the application 34 may use.

In addition, application relationship metadata 36 may include relationship type 22 of the applications 34 that identifies a type of hardware support provided by the applications 34. Relationship types may include, but are not limited to, companion applications, compatible applications, and enhancer applications. Companion applications may include, for example, applications published by an OEM or IHV officially to enable users to manage and/or operate a device. For example, a device manufacturer may publish an application for their gaming mice to program customizable buttons. Compatible applications may include, for example, applications published by third parties for specific devices. An example compatible application may include a third party application to control a television. Compatible applications may exist to fill functionality gaps and/or missing applications from the OEM. Enhancer applications may include applications that know to use classes of devices. For example, an imaging application that may be used with scanners.

Application relationship metadata 36 may optionally include one or more application relationship tables 40 that store the relationships between the associated hardware information 38 and the one or more applications 34. An example application relationship table 40 is illustrated in FIG. 2.

Figure 2:
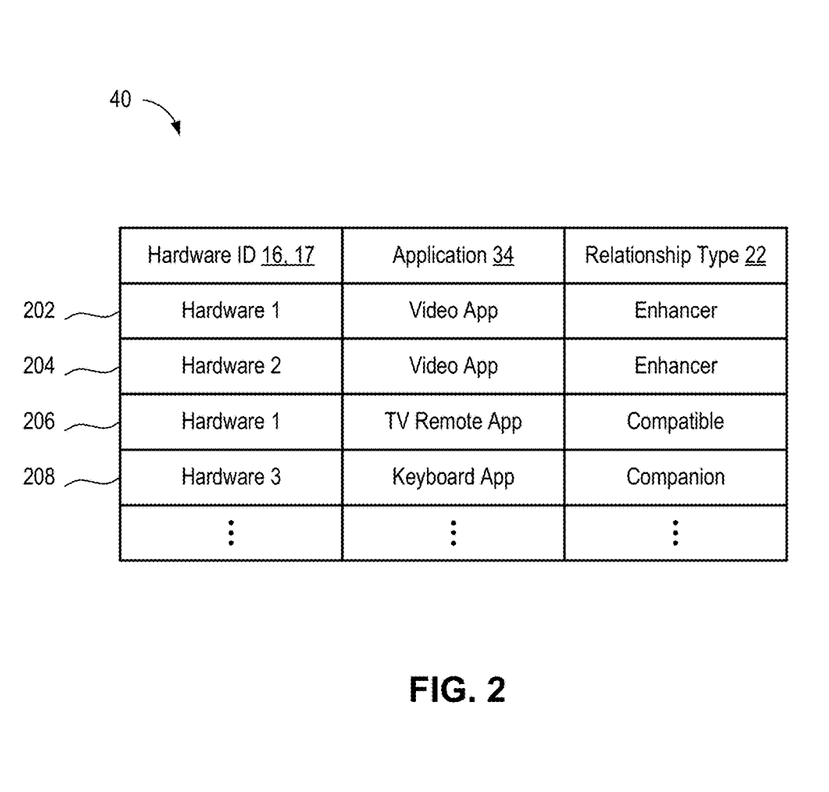
FIG. 2 is an example application relationship table stored at a remote application store in accordance with an implementation.

Referring now to FIG. 2, application relationship table 40 may include an association between hardware IDs 16, 17, application 34, and relationship type 22. Application relationship table 40 may be used by application filter component 42 (FIG. 1) to identify one or more applications 34 that may be available for use with computer device 102 and/or devices 108. For example, rows 202 and 204 may show the relationship between a video application and the hardware that the video application may be designed to use (e.g., hardware 1 and hardware 2). In addition, rows 202 and 204 may identify the relationship of the video application as an enhancer to hardware 1 and hardware 2. Row 206 of the table may show that a television remote application supports hardware 1 and is a compatible application to hardware 1. In addition, row 208 may show that a keyboard application supports hardware 3 and is a companion application to hardware 3.

If application request 12 (FIG. 1) includes hardware 1 has the hardware ID 16 of computer device 102, application filter component 42 may compare the received hardware ID, for example, hardware 1, to the rows of application relationship table 40 to retrieve applications 34 that match the received hardware ID. For example, application filter component 42 may retrieve the video application and the television remote applications as available applications 20 because the received hardware ID 16, hardware 1, matches the hardware IDs of rows 202 and 206.

In another example if application request 12 includes hardware 3 as the hardware ID 16, application filter component 42 may retrieve the keyboard application as an available application 20 for use with computer device 102 because the received hardware ID 16, hardware 3, matches the hardware ID of row 208.

In another example, if application request 12 includes hardware 1 as the hardware ID 16 and enhancer as the relationship type 22, application filter component 42 may retrieve the video application as an available application 20 for use with computer device 102 because the received hardware ID 16, hardware 1, matches the hardware ID of row 202 and the received relationship type 22, enhancer, matches the relationship type of row 202.

As such, application relationship table 40 may be used by application filter component 42 to identify one or more applications 34 that may be available for use with computer device 102 and/or devices 108 based at least on the information included in the application request 12.

Referring back to FIG. 1, application filter component 42 may use the application relationship metadata 36 to generate an available application list 18 with one or more available applications 20 having application relationship metadata 36 that identifies compatible usage with the received hardware IDs 16, 17. The one or more available applications 20 may be a subset of the applications 34 included in the application catalogue 32. In an implementation, the one or more available applications 20 may have associated hardware information 38 that matches the hardware IDs 16, 17 received in the application request 12.

In addition, application filter component 42 may use the application relationship metadata 36 to optimize the available application list 18 based on one or more additional search criteria included in the applications request 12. For example, application filter component 42 may only include applications that match the received hardware IDs 16, 17 and also have a relationship type 22 of companion applications. The application relationship metadata 36 may expose a richer relationship between the applications 34 and the hardware supported by the applications 34 that may be used by application filter component 42 to vary the available applications 20 included in the available application list 18. Thus, instead of a one to one relationship where one device matches one application published by a manufacturer of a device and vice versa, the applications may match to hardware not made by the manufacturer and may match to classes of devices.

As such, remote application store 106 may generate a curated available application list 18 with available applications 20 having application relationship metadata 36 that identifies compatible usage to the hardware of computer device 102 and/or devices 108 in communication with computer device 102. The available application list 18 may show available applications 20 created by OEMs that match the specific model of computer device 102 and/or devices 108. In addition, the available application list 18 may show companion and/or enhancer applications published by IHVs and/or third parties for the hardware of computer device 102 and/or devices 108.

Remote application store 106 may transmit the available application list 18 to device application store 10. Device application store 10 may present the available application list 18 on a user interface 54 of display 44. A user of computer device 102 may select one or more available applications 20 from the available application list 18 to install on computer device 102.

In an implementation, device application store 10 may automatically install one or more available applications 20 from the available application list 18 on computer device 102 and/or automatically prompt a user to select an available application 20 to install on computer device 102. For example, a predefined policy may indicate that when an available application 20 has a relationship type 22 of a companion application, device application store 10 may automatically install the available application 20 on computer device 102. Moreover, the predefined policy may indicate that when an available application 20 has a relationship type 22 of a compatible application, device application store 10 may automatically prompt a user to select the available application 20 for installation on computer device 102. As such, device application store 10 may automatically search for available applications 20 and when available applications 20 are found may automatically install and/or prompt a user to install the available applications 20 based on a defined policy.

Device application store 10 may query remote application store(s) 106 to find available applications 20 that match the hardware of computer device 102 and/or devices 108 instead of the information being hardcoded into a driver package. For example, device application store 10 may automatically query remote application store(s) 106 for available applications 20 that match the hardware ID 17 of a new plug and play device 108 in communication with computer device 102 without the IHV developing a driver package for the applications. Thus, device application store 10 may automatically discover, offer, and/or install available applications 20 in control panels, or other system device use flows, independent of driver packages.

In an implementation, a user of computer device 102 may access device application store 10 to search for available applications 20. User interface 54 may present the user with an option to perform one or more searches for available applications 20. The application request 12 may include the device IDs 14, 15 and/or the hardware IDs 16, 17 of the devices the users selected to include in the application request 12. In addition, application request 12 may include additional search criteria, such as, but not limited to, a relationship type 22 of the applications to the hardware IDs 16, 17. User interface 54 may present to the user the received available application list 18 with one or more available applications 20 having application relationship metadata 36 that identifies compatible usage with the hardware IDs 16, 17 and/or the additional search criteria. The user may select one or more available applications 20 to install or use with computer device 102. For example, a user may access device application store 10 and generate an application request 12 to show available applications 20 for a virtual reality (VR) headset and a television in communication with computer device 102. Device application store 10 may receive an application to stream video to the television and another application to use the VR headset. As such, device application store 10 may be used to showcase applications specific to computer device 102 and/or devices 108.

In another implementation, a user of computer device 102 may access a device settings page that may list the one or more devices 108 in communication with computer device 102 and the available application list 18 for each of the devices 108. In an implementation, a hardware manager 26 may provide a list of devices 28 (e.g., one or more devices 108) in communication with computer device 102. For example, hardware manager 26 may communicate with device locator 24 and may receive the device IDs 15 and/or hardware IDs 17 of devices 108 in communication with computer device 102. Hardware manager 26 may generate a list of devices 28 that may include the device IDs 15 of the devices 108 in communication with computer device 102.

Hardware manager 26 may also communicate with device application store 10 and may receive the available application list 18 for each of the devices 108 in communication with computer device 102. As such, hardware manager 26 may present the list of devices 28 and the available application list 18 for each of the devices 108 on user interface 54 of display 44. A user may, for example, select one or more available applications 20 from the available application list 18 to install and/or use with computer device 102. In an implementation, links to the available applications 20 may be provided. As such, when a user selects the link associated with available application 20, available application 20 may be installed on computer device 102. In an implementation, hardware manager 26 may also present applications already installed on computer device 102 in addition to the available application list 18. A user may access applications already installed on computer device 102 by selecting the link.

Hardware manager 26 may also receive an indication of one or more required applications 19 for operating a process on the list of devices 28. Required applications 19 may include, but are not limited to, additional software needed for a workflow, a task, and/or a process to operate and/or complete on a device. For example, device 108 may be a printer and a print job may start processing on the printer. Before the print job may finish on the printer, hardware manager 26 may receive an indication that a required application 19 may need to be downloaded and installed on computer device 102 and/or device 108 in order to complete the print job. As such, hardware manager 26 may communicate with device application store 10 to send an application request 12 to the remote application store(s) 106 with the device ID 15 and/or hardware ID 17 of the printer to retrieve the required application 19. In an implementation, hardware manager 26 may communicate directly with the remote application store(s) 106 to retrieve the required application 19 for device 108.

Hardware manager 26 may receive the required application 19 from device application store 10 and/or the remote application store(s) 106 and may install the required application 19 on computer device 102 and/or device 108 in order for the process and/or workflow to complete. In-line acquisitions of required applications 19 may automatically occur during the performance of a task so that the task may be completed.

As such, computer device 102 may automatically discover, offer, and/or install new applications for use with the hardware of computer device 102 and/or devices 108 independent of using driver packages of the computer devices.

Figure 3:
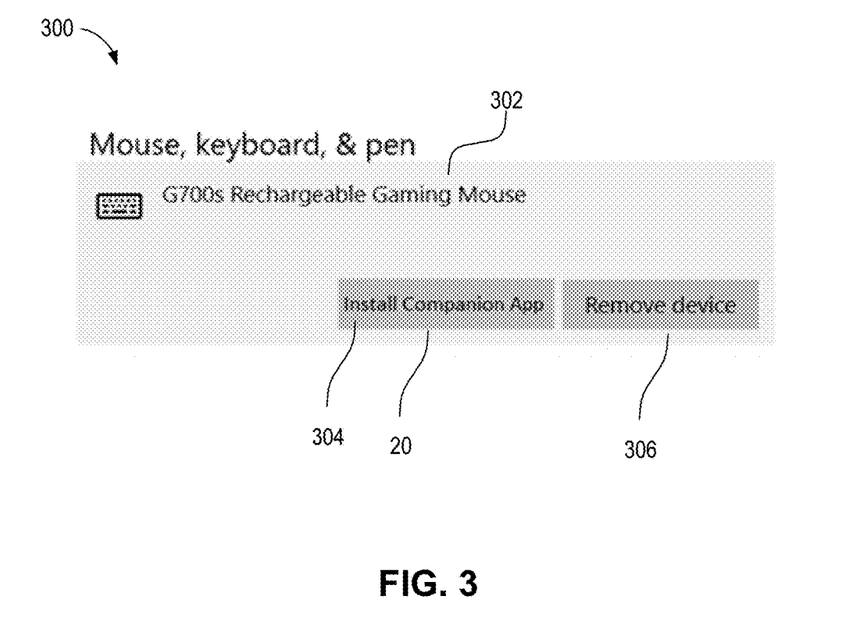
FIG. 3 is an example user interface screen with an available application for a device in communication with a computer device in accordance with an implementation.

Referring now to FIG. 3, an example user interface screen 300 may display an available application 20 for a device 302 in communication with computer device 102 (FIG. 1). In an implementation, user interface screen 300 may be displayed in a device settings page of computer device 102 that displays a rechargeable gaming mouse 302 in communication with computer device 102. In addition, user interface screen may indicate that an available application 20 is a companion application to the gaming mouse 302. User interface screen 300 may allow a user to install the available application 20 on computer device 102. For example, a user may select the button and/or link 304 on user interface screen 300 to install the available application 20. Thus, with one click of button and/or link 304, a user may retrieve the available application 20 from device application store 10. In addition, user interface screen 300 may provide a user with an option to remove the gaming mouse 302 from computer device 102 by selecting the button and/or link 306. As such, user interface screen 300 may present one or more available applications 20 for use with the hardware of the gaming mouse 302 and may allow a user to manage the gaming mouse 302 through user interface screen 300.

Figure 4:
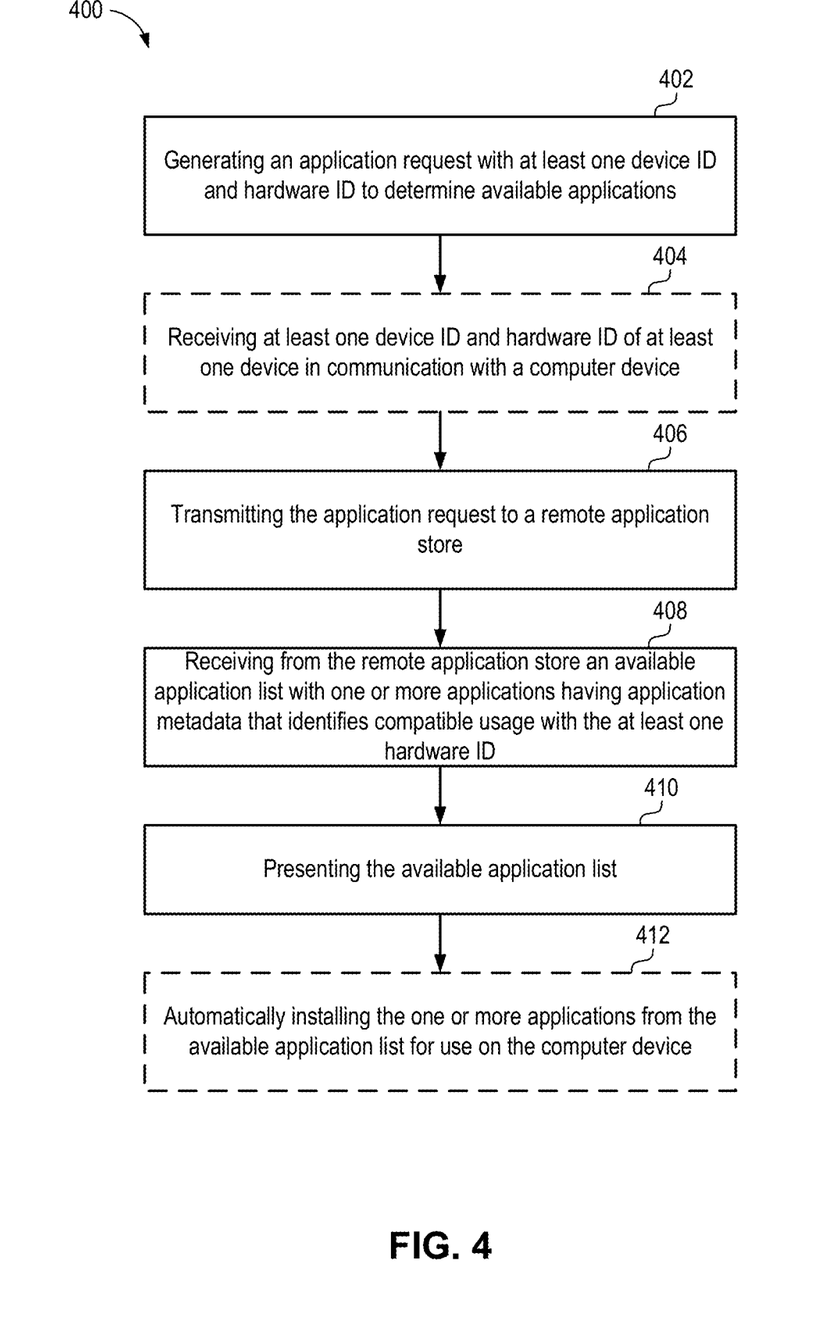
FIG. 4 is an example method flow for identifying available applications for use with hardware of a computer device in accordance with an implementation.

Referring now to FIG. 4, an example method flow 400 for identifying available applications 20 (FIG. 1) for use with hardware of a computer device 102 (FIG. 1) is discussed in connection with the description of the architecture of FIG. 1.

At 402, method 400 may include generating an application request with at least one device ID and hardware ID to determine available applications. For example, device application store 10 may transmit an application request 12 to one or more remote application stores 106 to determine one or more available applications 20 for computer device 102. The application request 12 may include the device ID 14 and the hardware ID 16 for computer device 102. The application request 12 may also include additional search criteria, such as, but not limited to, a relationship type 22 requested for the one or more available applications 20. For example, the application request 12 may only want to identify available applications 20 with a relationship type 22 of companion applications so that only official OEM applications for the hardware ID 16 may be identified. Another example search criteria may be a specific type of application. For example, the application request 12 may only want to identify video applications. As such, the application request 12 may be used to query the remote application stores 106 for available applications 20 that match the hardware ID 16 and/or additional search criteria that may be included in the application request 12.

At 404, method 400 may optionally include receiving at least one device ID and hardware ID of at least one device in communication with a computer device. One or more devices 108 may be in communication with computer device 102. Devices 108 may be, for example, plug and play devices connected to computer device via a wired connection 111, such as, but not limited to PCI and USB devices. Devices 108 may also be protocol devices, such as, but not limited to, Bluetooth and UPnP devices in communication with computer device 102 via network 104.

Device application store 10 may receive one or more device IDs 15 and/or hardware IDs 17 of one or more devices in 108 in communication with computer device 102 from a device locator 24 on computer device 102. The hardware ID may be the device identity from the various hardware stacks. Device locator 24 may actively listen for new device 108 arrivals. For example, when a new plug and play device 108 is connected to computer device 102, device locator 24 may identify the new device 108 and may transmit the device ID 15 and/or hardware ID 17 to device application store 10. In addition, device locator 24 may identify new network devices 108 in communication with computer device 102 via, for example, Bluetooth, WSD, BTLE beacon and/or other network connections, and may transmit the device ID 15 and/or hardware ID 17 of the identified devices 108 to device application store 10. For example, device locator 24 may identify a new wireless keyboard in communication with computer device 102.

At 406, method 400 may include transmitting the application request to a remote application store. Device application store 10 may transmit an application request 12 to one or more remote application stores 106 to determine one or more available applications 20 for computer device 102 and/or one or more devices 108 in communication with computer device 102. The application request 12 may include device ID 14 and/or hardware ID 16 of computer device 102. In addition, the application request 12 may include one or more device IDs 15 and hardware IDs 17 up to m (where m is an integer) of devices 108 in communication with computer device. The application request 12 may also include additional search criteria, such as, but not limited to, a relationship type 22 requested for the one or more available applications 20.

Device application store 10 may automatically perform one or more queries for available applications 20 based on the device ID 14, hardware ID 16 of computer device 102, and/or other predefined search criteria. In addition, device application store 10 may automatically perform one or more queries for available applications 20 based on any received device IDs 15 and/or hardware IDs 17 of devices 108 in communication with computer device 102. For example, device application store 10 may transmit one or more application request 12 with the device IDs 14, 15, the hardware IDs 16, 17, and/or additional search criteria, such as relationship type 22 to remote application store(s) 106.

In an implementation, a user of computer device 102 may access device application store 10 to search for available applications 20. For example, user interface 54 may present the user with an option to perform one or more searches for available applications 20. The application request 12 may include the device IDs 14, 15 and/or the hardware IDs 16, 17 of the devices the users selected to include in the application request 12. In addition, the user may provide additional search criteria, such as, relationship type 22 and/or a type of application (e.g., television applications).

At 408, method 400 may include receiving from the remote application store an available application list with one or more applications having application relationship metadata that identifies compatible usage with the at least one hardware ID and/or any additional search criteria. Device application store 10 may receive the available application list 18 from remote application store 106.

Remote application store 106 may include an application filter component 42 that may receive the application request 12 from computer device 102. Application filter component 42 may filter the application catalogue 32 and determine one or more available applications 20 based on at least the received hardware IDs 16, 17. In addition, application filter component 42 may filter the application catalogue 32 based on the additional search criteria received.

Application filter component 42 may access application relationship metadata 36 associated with applications 34 in the application catalogue 32 to determine the available applications 20 for computer device 102 and/or devices 108. Application relationship metadata 36 may include, for example, hardware information 38 that identifies compatible usage between applications 34 and various hardware. An application developer may identify a relationship between the application 34 and the various hardware that the application 34 supports. For example, an application developer may associate one or more hardware IDs of hardware the application may be designed to use when providing the application 34 to remote application store 106. An application may have a 1 to r (where r is an integer) matches to hardware the application supports. A match may be defined as a hardware ID, hardware type, and a relationship type. As such, applications may match to a variety of hardware and/or to a plurality of device classes. In addition, an application package associated with the application 34 may be updated to include the relationship information that identifies the various hardware compatibility that the application 34 may be designed to work with and/or operate on.

In addition, application relationship metadata 36 may include a relationship type 22 of the applications 34 that identifies a type of hardware support provided by the applications 34, including, but not limited to, companion applications, compatible applications, and enhancer applications.

Application filter component 42 may use the application relationship metadata 36 to generate an available application list 18 with one or more available applications 20 having application relationship metadata 36 that identifies compatible usage with the hardware IDs 16, 17 and/or any additional search criteria received. The one or more available applications 20 may be a subset of the applications 34 included in the application catalogue 32. In an implementation, the one or more available applications 20 may have associated hardware information 38 that matches the hardware IDs 16, 17 received in the application request 12. In addition, application filter component 42 may use the application relationship metadata 36 to optimize the available application list 18 based on one or more features. For example, application filter component 42 may only include applications that match the received hardware IDs 16, 17 and have a relationship type 22 of companion applications. The application relationship metadata 36 may expose a richer relationship between the applications 34 and the hardware supported by the applications 34 that may be used by application filter component 42 to vary the available applications 20 included in the available application list 18. Thus, instead of a one to one relationship where one device matches one application published by a manufacturer of a device and vice versa, the applications may match to hardware not made by the manufacturer and may match to classes of devices.

Remote application store 106 may transmit the available application list 18 to device application store 10.

At 410, method 400 may include presenting the available application list. For example, device application store 10 may present the received available application list 18 with one or more available applications 20. The user may select one or more available applications 20 to install or use with computer device 102.

At 412, method 400 may optionally include automatically installing the one or more applications from the available application list for use on the computer device. Device application store 10 may automatically install one or more available applications 20 from the available application list 18 on computer device 102 and/or automatically prompt a user to select an available application 20 to install on computer device 102 based on a predefined policy. For example, a predefined policy may indicate that when an available application 20 has a relationship type 22 of a companion application, device application store 10 may automatically install the available application 20 on computer device 102. Moreover, the predefined policy may indicate that when an available application 20 has a relationship type 22 of a compatible application, device application store 10 may automatically prompt a user to select the available application 20 for installation on computer device 102.

As such, method 400 may be used to receive a curated available application list 18 with available applications 20 that may be applicable to the hardware of computer device 102 and/or devices 108 in communication with computer device 102. The available application list 18 may show available applications 20 created by OEMs that match the specific model of computer device 102 and/or devices 108. In addition, the available application list 18 may show companion and/or enhancer applications published by IHVs and/or third parties for the hardware of computer device 102 and/or devices 108. Method 400 may automatically discover, offer, and/or install new applications for use with the hardware of computer device 102 and/or devices 108 independent of using driver packages of the computer devices.

Figure 5:
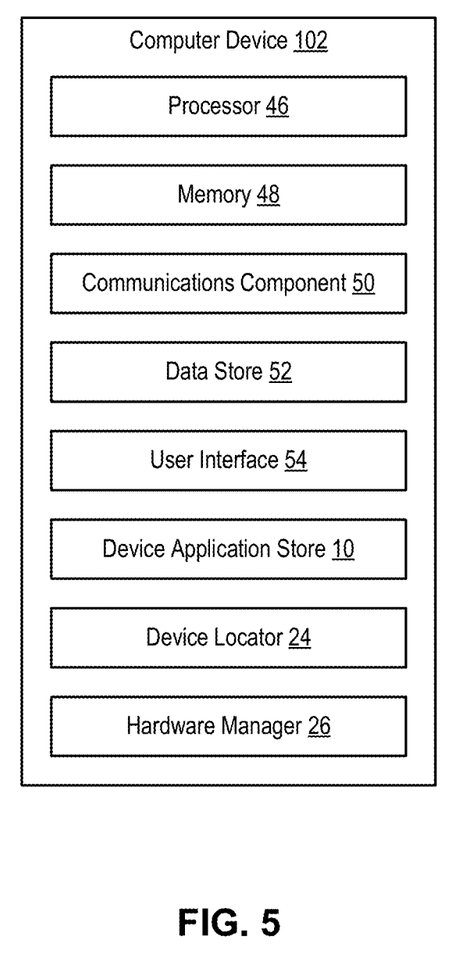
FIG. 5 is a schematic block diagram of an example computer device in accordance with an implementation of the present disclosure.

Referring now to FIG. 5, illustrated is an example computer device 102 in accordance with an implementation, including additional component details as compared to FIG. 1. In one example, computer device 102 may include processor 46 for carrying out processing functions associated with one or more of components and functions described herein. Processor 46 can include a single or multiple set of processors or multi-core processors. Moreover, processor 46 can be implemented as an integrated processing system and/or a distributed processing system.

Computer device 102 may further include memory 48, such as for storing local versions of applications being executed by processor 46. Memory 48 can include a type of memory usable by a computer, such as random access memory (RAM), read only memory (ROM), tapes, magnetic discs, optical discs, volatile memory, non-volatile memory, and any combination thereof.

Further, computer device 102 may include a communications component 50 that provides for establishing and maintaining communications with one or more parties utilizing hardware, software, and services as described herein. Communications component 50 may carry communications between components on computer device 102, as well as between computer device 102 and external devices, such as devices located across a communications network and/or devices serially or locally connected to computer device 102. For example, communications component 50 may include one or more buses, and may further include transmit chain components and receive chain components associated with a transmitter and receiver, respectively, operable for interfacing with external devices.

Additionally, computer device 102 may include a data store 52, which can be any suitable combination of hardware and/or software, that provides for mass storage of information, databases, and programs employed in connection with implementations described herein. For example, data store 52 may be a data repository for device application store 10 (FIG. 1), device locator 24 (FIG. 1), and/or hardware manager 26 (FIG. 1).

Computer device 102 may also include a user interface 54 operable to receive inputs from a user of computer device 102 and further operable to generate outputs for presentation to the user. User interface 54 may include one or more input devices, including but not limited to a keyboard, a number pad, a mouse, a touch-sensitive display, a navigation key, a function key, a microphone, a voice recognition component, any other mechanism capable of receiving an input from a user, or any combination thereof. Further, user interface 54 may include one or more output devices, including but not limited to a display, a speaker, a haptic feedback mechanism, a printer, any other mechanism capable of presenting an output to a user, or any combination thereof.

In an implementation, user interface 54 may transmit and/or receive messages corresponding to the operation of device application store 10, device locator 24, and/or hardware manager 26. In addition, processor 46 executes device application store 10, device locator 24, and/or hardware manager 26, and memory 48 or data store 52 may store them.

As used in this application, the terms "component," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computer device and the computer device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Various implementations or features may have been presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

The various illustrative logics, logical blocks, and actions of methods described in connection with the embodiments disclosed herein may be implemented or performed with a specially-programmed one of a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computer devices, e.g., a combination of a DSP and a microprocessor, a plurality of microprocessors, one or more microprocessors in conjunction with a DSP core, or any other such configuration. Additionally, at least one processor may comprise one or more components operable to perform one or more of the steps and/or actions described above.

Further, the steps and/or actions of a method or algorithm described in connection with the implementations disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some implementations, the processor and the storage medium may reside in an ASIC. Additionally, the ASIC may reside in a user terminal. In the alternative, the processor and the storage medium may reside as discrete components in a user terminal. Additionally, in some implementations, the steps and/or actions of a method or algorithm may reside as one or any combination or set of codes and/or instructions on a machine readable medium and/or computer readable medium, which may be incorporated into a computer program product.

In one or more implementations, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs usually reproduce data optically with lasers. Combinations of the above should also be included within the scope of computer-readable media.

While implementations of the present disclosure have been described in connection with examples thereof, it will be understood by those skilled in the art that variations and modifications of the implementations described above may be made without departing from the scope hereof. Other implementations will be apparent to those skilled in the art from a consideration of the specification or from a practice in accordance with examples disclosed herein.

What is claimed is:

1. A computer device, comprising:
a memory to store data and instructions;
a processor in communication with the memory;
an operating system in communication with the memory and the processor, wherein the operating system is operable to:
generate an application request with at least one device identification, a hardware identification, and a relationship type of an application to determine available applications, wherein the relationship type is one of a companion application, a compatible application, or an enhancer application;
transmit the application request to a remote application store;
receive, from the remote application store, an available application list with one or more applications having application relationship metadata that identifies compatible usage with the hardware identification and the relationship type; and
present the available application list on a display of the computer device.

2. The computer device of claim 1, wherein the operating system is further operable to:
automatically install at least one application from the one or more applications in the available application list based at least on the relationship type of the at least one application.

3. The computer, device of claim 1, wherein the operating system is further operable to:
receive one or more device identifications and one or more hardware identifications of one or more devices in communication with the computer device.

4. The computer device of claim 3, wherein the one or more devices are connected to the computer device via a wired connection.

5. The computer device of claim 3, wherein the one or more devices are in wireless communication with the computer device via a network.

6. The computer device of claim 3, wherein the application request further includes the one or more device identifications and the one or more hardware identifications of the one or more devices.

7. The computer device of claim 6, wherein the available application list includes the one or more applications having application relationship metadata that identifies compatible usage with the hardware identification of the computer device and the one or more hardware identifications of the one or more devices.

8. The computer device of claim 1, wherein the operating system is further operable to:
receive a selection of at least one application from the one or more applications in the available application list to install on the computer device; and
install the at least one application on the computer device.

9. A method for identifying available applications for use with hardware of a computer device, comprising:
generating, at an operating system executing on the computer device, an application request with at least one device identification, a hardware identification, and a relationship type of an application to determine available applications, wherein the relationship type is one of a companion application, a compatible application, or an enhancer application;
transmitting the application request to a remote application store;
receiving, from the remote application store, an available application list with one or more applications having application relationship metadata that identifies compatible usage, with the hardware identification and the relationship type; and
presenting the available application list on a display of the computer device.

10. The method of claim 9, further comprising:
automatically installing at least one application from the one or more applications in the available application list based at least on the relationship type of the at least one application.

11. The method of claim 9, further comprising:
receiving one or more device identifications and one or more hardware identifications of one or more devices in communication with the computer device.

12. The method of claim 11, wherein the one or more devices are connected to the computer device via a wired connection.

13. The method of claim 11, wherein the one or more devices are in wireless communication with the computer device via a network.

14. The method of claim 11, wherein the application request further includes the one or more device identifications and the one or more hardware identifications of the one or more devices.

15. The method of claim 14, wherein the available application list includes the one or more applications having application relationship metadata that identifies compatible usage with the hardware identification of the computer device and the one or more hardware identifications of the one or more devices.

16. The method of claim 9, further comprising:
receiving a selection of at least one application from the one or more applications in the available application list to install on the computer device; and
installing the at least one application on the computer device.

17. A non-transitory computer-readable instructions executable by a computer device, comprising:
at least one instruction for causing the computer, device to generate an application request with at least one device identification, a hardware identification, and a relationship type of an application to determine available applications, wherein the relationship type is one of a companion application, a compatible application, or an enhancer application;
at least one instruction for causing the computer device to transmit the application request to a remote application store;
at least one instruction for causing the computer device to receive, from the remote application store, an available application list with one or more applications having application relationship metadata that identifies compatible usage with the hardware identification and the relationship type; and
at least one instruction for causing the computer device to present the available application list on a display of the computer device.

18. The computer device of claim 1, wherein the operating system is further operable to automatically generate the application request to determine the available applications for use with hardware of a new device in communication with the computer device.

19. The method of claim 9, wherein the application request is automatically generated to determine the available applications for use with hardware of a new device in communication with the computer device.

* * * * *